United States Patent [19]

Staudinger

[11] 4,049,133
[45] Sept. 20, 1977

[54] PROCESS AND APPARATUS FOR THE SUPPLY OF A DRY, FREE-FLOWING COAL POWDER TO A HIGH-PRESSURE COAL GASIFICATION REACTOR

[75] Inventor: Gernot Staudinger, Amsterdam, Netherlands

[73] Assignee: Shell Internationale Research Maatschappij B.V., Netherlands

[21] Appl. No.: 676,725

[22] Filed: Apr. 14, 1976

[30] Foreign Application Priority Data

Apr. 24, 1975 Netherlands ............... 7504844

[51] Int. Cl.² ............................ B65G 65/32
[52] U.S. Cl. ................. 214/17 B; 214/17 CB; 214/152
[58] Field of Search .......... 214/17 B, 17 CB; 198/564, 642

[56] References Cited

U.S. PATENT DOCUMENTS

| 2,822,097 | 2/1958 | Lee | 214/17 CB |
| 3,182,825 | 5/1965 | Zellerhoff | 214/17 CB |

Primary Examiner—Robert G. Sheridan
Attorney, Agent, or Firm—Pravel, Wilson & Gambrell

[57] ABSTRACT

Dry coal powder is fed to a high-pressure coal gasification reactor from a high-pressure chamber in inert gas. The powder is introduced in the chamber via a centrifugal pump having an inlet tube passing through a wall of the chamber and a rotor inside the chamber, which rotor throws the powder into the chamber through radial nozzles by centrifugal force. Gas leakage from the chamber through the centrifugal pump is created to prevent blockage.

10 Claims, 2 Drawing Figures

PROCESS AND APPARATUS FOR THE SUPPLY OF A DRY, FREE-FLOWING COAL POWDER TO A HIGH-PRESSURE COAL GASIFICATION REACTOR

BACKGROUND OF THE INVENTION

The present invention relates to a process and apparatus for supplying coal powder to a high-pressure coal gasification reactor.

When supplying coal powder, such as lignite or black coal to a high-pressure coal gasification reactor, the gas pressure in the reactor, which in most cases is at least 10 atm. absolute, has to be overcome. Another problem connected with this supply is the high temperature of the reactor wall.

In order to solve these problems it has previously been suggested to separate the pressurizing of the coal powder and the introduction into the reactor. However, so far as is presently known, no one has provided a satisfactory process and/or apparatus for supplying powdered coal to a coal gasification reactor while operating under such high pressure.

SUMMARY OF THE INVENTION

Accordingly, the present invention relates to a process and apparatus for the supply of a dry, free-flowing coal powder to a high-pressure coal gasification reactor, in which process the coal powder is introduced with the aid of a centrifugal pump to a chamber that is brought under high pressure with an inert gas and in which process the coal powder is passed from the chamber to the reactor space within the aid of a dosing apparatus, which introduction of coal powder via the centrifugal pump is effected by feeding the coal powder via an inlet tube passing through the wall of the chamber to a rotating rotor installed in the chamber, which rotor throws the coal powder into the chamber by centrifugal force through centrifugal nozzles placed in a radial position with respect to the axis of rotation of the rotor and tapering outwards. In accordance with the process of the invention, gas leakage from the pressurized chamber to the centrifugal pump is created such that blockage and agglomeration of the coal powder in the centrifugal nozzles is prevented. Moreover, the present invention includes a new and improved apparatus capable of creating such gas leakage.

DETAILED DESCRIPTION OF THE INVENTION

Figure 1:
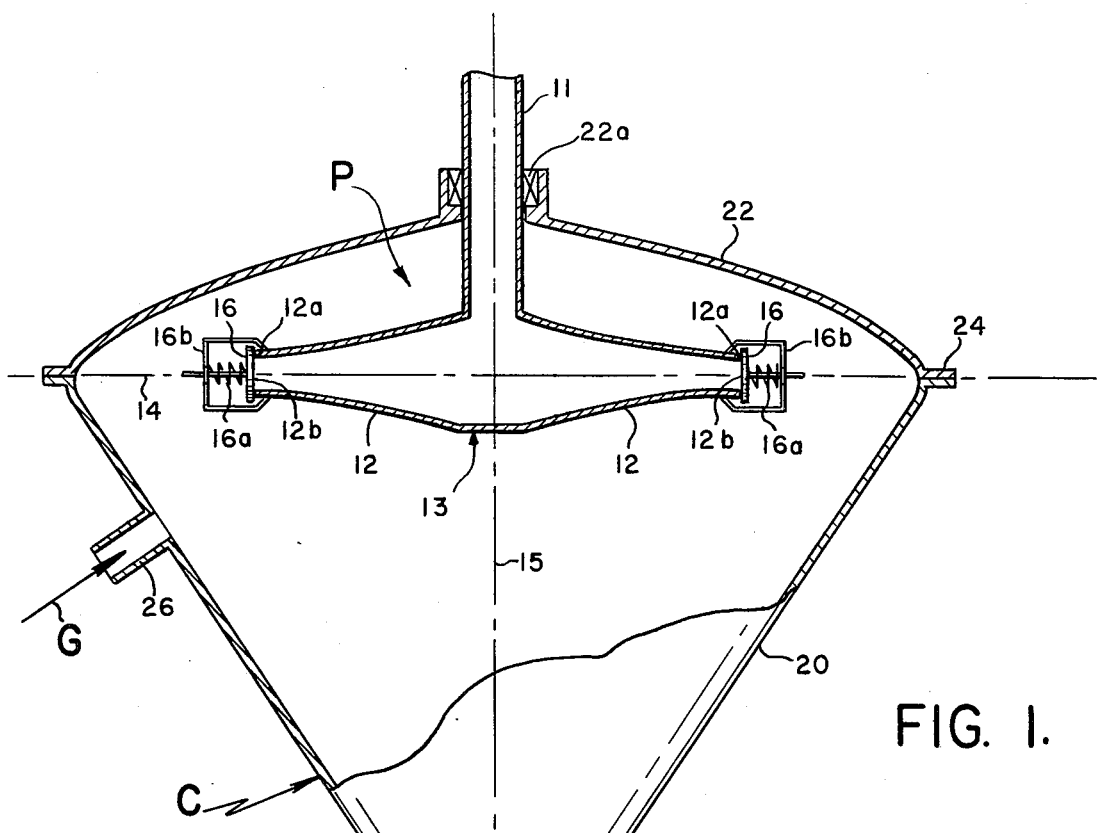
FIG. 1 is a partial schematic axial cross-sectional view of a chamber with a centrifugal pump that forms a part of an apparatus according to an embodiment of the invention.

In the process according to the summary, the coal powder is pressurized in a chamber and subsequently dosed from the chamber to the reactor. The pressure in the chamber will usually be at least equal to the reactor pressure. As a rule the coal powder is mixed with the air or oxygen required for the gasification before the powder enters the reactor. In view of the relatively long residence time of the coal powder in the chamber this mixing cannot take place there because of the explosion hazard. Mixing is usually effected in the burner into which the dosing apparatus with which the powder is brought from the chamber to the reactor debouches. Such a dosing apparatus may, for instance, be a screw conveyor, leading to the burner of the reactor, into which the line for air or oxygen also debouches. However, other designs are equally possible; for instance, one in which the coal particles are fluidized in the chamber and in which the coal particles are withdrawn from the chamber as a fluidized stream and, like the required air or oxygen, are dosed to a burner. As stated hereinbefore, the chamber is pressurized with a gas which is inert to coal powder, i.e., which contains little or no oxygen, and which usually has a low or relatively low temperature in comparison with the temperatures in the gasification reactor. Suitable gases for this purpose are, for instance, nitrogen, carbon dioxide, hydrogen, carbon monoxide, gaseous hydrocarbons and steam. Mixtures of these gases, with each other and/or with other gases, may also be used; as well as gas that has been obtained by the coal gasification and cooled. This inert gas is introduced into the chamber by another way than the coal powder. Possibly, the coal powder in such a chamber is in a more or less fluidized state.

With the aid of the centrifugal pump mentioned in the summary, the coal powder is introduced into the chamber against the high gas pressure. There is also gas in the various parts of the centrifugal pump through which the coal powder flows. The gas pressure in the inlet tube passing through the wall of the chamber wll differ relatively little from the gas pressure in the space filled with coal powder to which the inlet tube debouches at a place outside the chamber, optionally via a transport device, such as a screw conveyor.

Since immediately beyond the centrifugal nozzles a high pressure prevails in the chamber, there is a considerable difference in gas pressure with respect to the place where the inlet tube enters the centrifugal nozzles. Consequently, there is a considerable drop in gas pressure across the centrifugal nozzles against the direction of flow of the coal powder. This pressure difference must be overcome by the flowing coal particles through the centrifugal force. Accordingly, each value of the pressure difference requires a corresponding minimum speed of the rotor of the centrifugal pump to force out the coal particles. In fact, at any point in the centrifugal nozzles are centrifugal force on the particles (compensated for frictional losses) must be larger than the forces acting on the particles as a result of the gas pressure. Also, the larger the total difference in gas pressure to be overcome, the longer the centrifugal nozzles have to be and/or the faster they would have to rotate to provide the required centrifugal force.

When all these requirements have been met, the process according to the summary is still liable to blockage of the centrifugal nozzles and the present invention is meant to indicate a measure by which this can be prevented.

To this end, according to the invention, such a gas leakage from the chamber to the centre of the centrifugal pump via the centrifugal nozzles is created that the gas pressure at any point in these nozzles is 70 to 90% of the pressure exerted at that point on the coal particles by the centrifugal force and by friction.

Such a control of the gas pressure in the centrifugal nozzles prevent excessive compaction of the coal particles — which in all probability leads to blockage by bridging. At constant rotor speed, the centrifugal force on the coal particles gradually increases towards the ends of the nozzles. However, the velocity of the coal particles through the nozzle at any given point in that nozzle depends not only on this centrifugal force, but also on the friction between the particles themselves and between the particles and the nozzle wall and on the resistance offered to the particles by the gas.

The measure according to the invention keeps the forces on the coal particles between one another and of the coal particles on the wall of the nozzle small. At no point are the coal particles in the nozzle "blown back" by overpressure of the inert gas in the direction opposite to the normal supply or, through lack of gas, compacted as a result of large forces between one another.

A possible explanation of the favorable effect of the measure according to the invention — trouble-free operation of the centrifugal pump — is the fact that a certain quantity of gas is continuously entrained with the coal particles out of the centrifugal pump, which gas must be made up to ensure a desired gas pressure distribution through the centrifugal nozzles. For a stable gas equilibrium to be established at least as much gas will have to be made up as is carried off as entrapped and entrained gas from any point in the centrifugal pump. To ensure this, a certain quantity of gas has to be supplied, which, according to the measure of the invention, is achieved by creating a flow of gas that is leaking in. Since the quantity of gas to be compensated for at any point in the centrifugal pump will depend on the total throughput of the coal powder per unit time and because this throughput may vary, it is preferably to have a wide margin for leaking gas.

In the process according to the invention use may be made, if desired, of a rotatable inlet tube for the supply of coal powder to the rotating rotor. The rotor may then be mounted on the inlet tube, so that the rotor can be made to rotate by driving the inlet tube, which passes through the wall of the chamber, by means of a mechanism placed outside the chamber. The gas leakage to be maintained according to the present invention may take place via the rotor, through the inlet tube, if desired, and out. However, at the place where the inlet tube is fitted in the wall of the chamber, the space between the outer wall of the inlet tube and the wall of the chamber must be properly sealed, because leakage of gas at that location must be prevented. The leakage of gas may occur in countercurrent with the coal particles via the interior of the inlet tube. In the ideal case just as much gas leaks to the nozzles as is carried off from them with the coal particles, so that no leakage needs to occur via the inlet tube.

The apertures in the rotor through which the coal particles are thrown from the centrifugal pump into the chamber and through which gas penetrates from the chamber into the centrifugal pump are located at the free ends of the centrifugal nozzles. It is possible to provide these apertures with valves, which open against spring tension under the influence of the centrifugal force on the valve mass and on the mass of coal particles. When the rotor is stationary or when its speed is too low or when the pressure in the chamber is too high the valves are closed, so that the coal powder in the centrifugal nozzles is not blown back to the inlet tube by the inert gas from the chamber.

The quantity of coal powder that is supplied to the chamber can be controlled by varying the rotor speed and/or the quantity of powder that is fed to the centrifugal pump. Obviously, this only applies within certain limits: When the capacity of the inlet tube is fully utilized, a further increase of the rotor speed has no effect. At a given rotor speed it is often possible to diminish the feed rate of powder, depending on whether the inlet tube leads to a space filled with coal powder direct or via a transport device.

According to an embodiment of the invention the coal powder is introduced into the chamber via centrifugal nozzles narrowing in an inverse trumpet shape. It has been found that with the geometry, in contrast to the conical shape, a gas pressure distribution can be achieved in the centrifugal nozzles which closely matches the pattern of the centrifugal force on the coal particles, compensated for frictional losses.

According to another embodiment of the invention the coal powder is introduced into the chamber via centrifugal nozzles whose walls are provided with holes at locations between the two ends. In such centrifugal nozzles provided with holes, a proper dimensioning of the holes makes it possible to achieve a gas pressure profile that follows in the desired way the changes in the centrifugal force on the coal particles, compensated for frictional losses. It is found that little if any coal powder penetrates into the chamber through those holes, but that, on the contrary, via the holes the inert gas is sucked into the centrifugal nozzles. At least part of this inert gas is then entrained with the coal particles and a part may leak away via the centrifugal nozzles and the inlet tube.

In the above-mentioned embodiment the holes are preferably provided with valves. These valves may open, for instance, against spring tension and/or under the influence of the centrifugal force against the relatively high gas pressure in the chamber and they may close when the rotor is stationary or when its speed is too low. It is even possible to make the position of the valves dependent on the speed of the centrifugal pump. Since the gas pressure in the centrifugal nozzles must follow the centrifugal force (compensated for frictional losses) as closely as possible and since the centrifugal force will depend on the speed of the centrifugal pump the use of adjustable valves may be advantageous.

According to the invention the gas leakage to the centrifugal pump is preferably 0.1–5% wt. of the coal powder throughput. In this way the supply of gas to the centrifugal nozzles is sufficient to obtain the desired gas pressure.

The invention also relates to an apparatus for the supply of coal powder to a high-pressure coal gasification reactor, comprising a chamber C with means for gas supply G and with a centrifugal pump P for the supply of coal powder to the chamber C, which comprises an inlet tube 11 passing through the wall of the chamber C and rotatable centrifugal nozzles 12 in the chamber C, which nozzles 12 are grouped to form a rotor 13 and which connect with and are in a radial position relative to the inlet tube 11 and taper outwards, and which also comprises a dosing apparatus D for passing coal powder from the chamber to a gasification reactor R.

According to a first embodiment of this apparatus the centrifugal nozzles 12, according to the invention, narrow in an inverse trumpet shape (FIG. 1).

According to a second embodiment (FIG. 2) the wall 32c of the centrifugal nozzles 32 is provided with holes 32d, 32e and 32f in places between the two ends 32a, 32g. The said holes may be provided with valves 37, 38 and 39.

Hereinafter two embodiments of the apparatus and an example of a process according to the invention will be further described with reference to the corresponding drawing.

FIG. 1 shows a chamber C consisting of a funnel-shaped housing 20 and a cover 22 fixed onto it with the aid of a flange 24. Via a gas inlet 26 the interior of the chamber can be filled with a compressed inert gas. Rotatably mounted in the chamber C is a centrifugal pump P, consisting of a number of centrifugal nozzles 12 integral with an inlet tube 11, which passes through a bearing in cover 22 at 22a and which can be driven by means not shown in the figure. Coal powder can be supplied via inlet tube 11 to the centrifugal nozzles 12 by means not shown in the figure. The chamber C further has an outlet 28 for the discharge of coal powder from the chamber to a high-pressure coal gasification reactor R with the aid of a dosing apparatus D.

The centrifugal nozzles 12 communicate directly with inlet tube 11 and have an oblong shape. Their longitudinal axes 14 are perpendicular to the axis 15 of inlet tube 11. The total number of centrifugal nozzles 12 is to a certain extent dependent on the desired duty of the centrifugal pump. The centrifugal nozzles 12 each have a valve 16 at the free end 12a, which valve 16 is pressed against the aperture 12b by a spring 16a mounted in a clamp 16b. The centrifugal nozzles 12 have a trumpet-shaped longitudinal cross-section.

The part shown in FIG. 1 of the apparatus for the supply of coal powder to a high-pressure coal gasification apparatus works as follows:

The centrifugal pump C is put into operation by rotating inlet tube 11. Inert gas is pumped into the chamber C via inlet 26. When the gas pressure in the chamber has reached the value at which the gasification reactor to be fed is operated, coal powder is fed via inlet tube 11 to the centrifugal nozzles 12. As soon as the centrifugal pump P has reached the required rotation speed, at which speed valves 16 are opened, against spring pressure and gas pressure, by the centrifugal force exerted on the valve mass and the coal mass, the coal powder is thrown out of the nozzles 12 into the chamber C.

A quantity of inert gas penetrates into centrifugal nozzles 12 in countercurrent with the coal particles and part of it may leak away via inlet tube 11. The rest is entrained with the stream of coal particles. The coal particles in nozzles 12 should be in a more or less fluidized state in the inert gas in order to prevent agglomeration and bridging. As soon as equilibrium has been established there is a certain gas pressure drop across the layer of coal particles in the nozzles 12: the gas pressure in the chamber C is high, that in the inlet tube 11 low. Now, the pressure drop between the chamber C and a certain cross-section in a nozzle 12 is partly dependent on the situation prevailing in the intermediate layer of coal particles.

By choosing a trumpet-shaped profile of the nozzles 12 the pressure difference between the chamber C and a cross-section of the nozzle 12 is made to increase steadily inwards in such a way as to follow the changes in the centrifugal force on the coal particles, compensated for frictional losses.

It has been found that in this way blockage in the centrifugal pump can be prevented.

Figure 2:
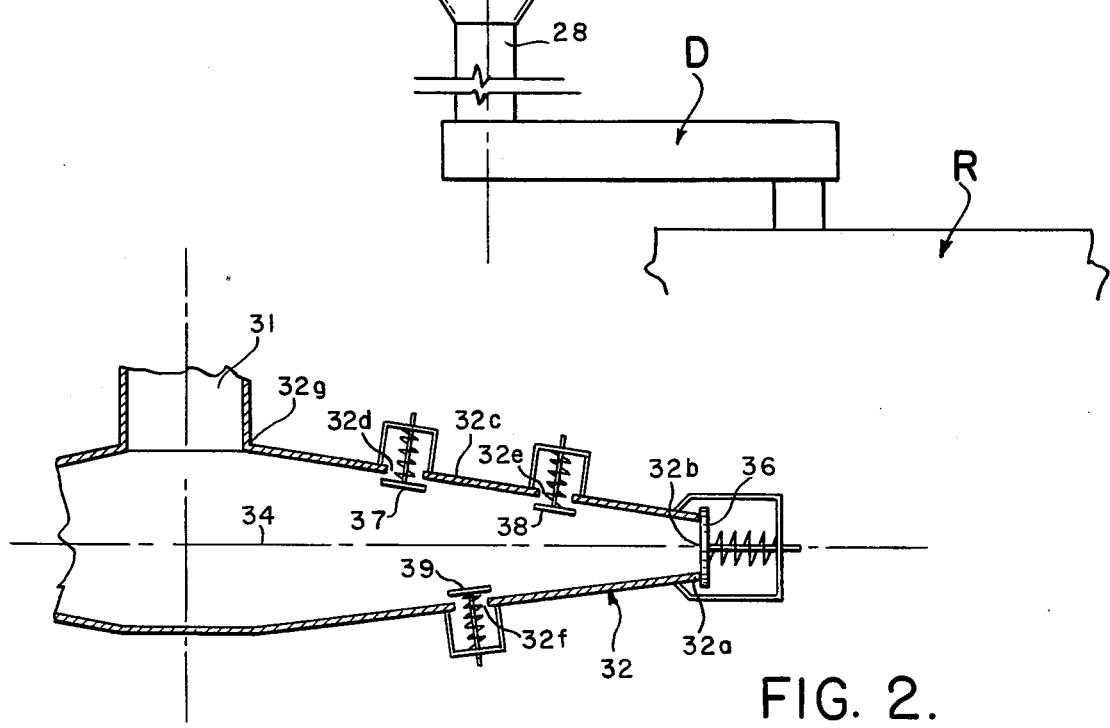
FIG. 2 is a schematic axial cross-sectional view, partially cut away, of a centrifugal nozzle according to an alternative embodiment of the apparatus according to the invention.

In FIG. 2 an axial cross-section on a magnified scale of an alternate embodiment is shown as including a centrifugal nozzle 32 with part of inlet tube 31, with the associated valve 36 on the open end 32a of the nozzle 32. The centrifugal nozzle 32 has a truncated-cone-shaped profile with centre line 34 as the axis of symmetry. In the wall 32c of the nozzle three valves 37, 38, and 39 have been installed, which open against spring pressure under the influence of the gas pressure in the chamber. As a result of the inert gas flowing from the chamber C via the valve openings 32d, 32e, 32f into the nozzle 32, the gas pressure throughout the nozzle 32 can attain the desired value, provided that the holes 32d, 32e and 32f are correctly dimensioned and located.

In order to given an impression of the process according to the invention, an example is given hereinafter.

EXAMPLE

For feeding a coal gasification reactor operating at a pressure of 30 atm absolute, a chamber is used having a capacity of 10 tons of coal powder per hour. The design of the chamber with centrifugal pump is in conformity with the principle of FIG. 1. In the chamber a nitrogen atmosphere is maintained at a pressure of 30 atm absolute. The power required for the centrifugal pump is found to be about 1 kWh/ton coal powder. The gas leakage from the chamber via the centrifugal pump is 0.01 kg of leaking gas per kg of coal powder supplied and there is no blockage of the centrifugal pump.

I claim:

1. In a process for the supply of a dry, free-flowing coal powder to a high-pressure coal gasification reactor, wherein the coal powder is introduced by means of a centrifugal pump into a chamber brought under high pressure with an inert gas and wherein the coal powder is passed from the high-pressure chamber into a reactor space of a high-pressure coal gasification reactor by means of a dosing apparatus communicating therebetween, the improvement comprising:
    introducing the coal powder into the pressurized chamber via a centrifugal pump comprising an inlet tube passing through a wall of the chamber and a rotatable rotor connected with the inlet tube and disposed in the chamber, said rotatable rotor including a plurality of outwardly tapering centrifugal nozzles disposed in a radial position with respect to the axis of rotation of the rotor, said coal powder being introduced by:
    feeding the coal powder via the inlet tube to the rotor; and
    rotating the rotor to throw the coal powder into the chamber by centrifugal forcce through the outwardly tapered centrifugal nozzles and to create a gas leakage from the chamber to the center of the centrifugal pump via the outwardly tapered centrifugal nozzles such that the gas pressure at any point in the centrifugal nozzles is about 70 to about 90% of the pressure exerted at that point on the coal particles by centrifugal force and by frictional force between respective coal particles and between the coal particles and said centrifugal pump whereby blockage of the coal particles in said centrifugal nozzles is prevented.

2. The process of claim 1, wherein the introduction of coal particles into the pressurized chamber includes creating just as much gas leakage from the chamber to the centrifugal pump as is entrained with coal particles thrown from the centrifugal pump nozzles.

3. The process of claim 1, wherein the coal powder is inroduced into the pressurized chamber by feeding the coal powder through rotating centrifugal nozzles, each respectively having a longitudinal inverse trumpet shape.

4. In a process for the supply of a dry, free-flowing coal powder to a high-pressure coal gasification reactor, wherein the coal powder is introduced by means of a centrifugal pump into a chamber brought under high pressure with an inert gas and wherein the coal powder is passed from the high-pressure chamber into a reactor space of a high-pressure coal gasification reactor by means of a dosing apparatus communicating therebetween, the improvement comprising:

introducing the coal powder into the pressurized chamber via a centrifugal pump comprising an inlet tube passing through a wall of the chamber and a rotatable rotor connected with the inlet tube and disposed in the chamber, said rotatable rotor including a plurality of outwardly tapering centrifugal nozzles disposed in a radial position with respect to the axis of rotation of the rotor, said coal powder being introduced by:

introducing the coal powder into the pressurized pressure chamber by feeding the coal powder through rotating centrifugal nozzles, each respectively having walls provided with holes disposed between opposing ends thereof to permit gas leakage from the chamber therethrough; and rotating the rotor to throw the coal powder into the chamber by centrifugal force through the outwardly tapered centrifugal nozzles and to create a gas leakage from the chamber to the center of the centrifugal pump via the outwardly tapered centrifugal nozzles such that the gas pressure at any point in the centrifugal nozzles is about 70 to about 90% of the pressure exerted at that point on the coal particles by centrifugal force and by frictional force between respective coal particles and between the coal particles and said centrifugal pump whereby blockage of the coal particles in said centrifugal nozzles is prevented.

5. The process of claim 4, wherein the centrifugal nozzles include valves respectively provided with said holes for controlling the gas leakage therethrough during the rotation of the nozzles.

6. The process of claim 5, wherein the holes and valves of the centrifugal nozzles are disposed at respectively predetermined positions between opposing ends of the nozzles, said positions being dependent upon the rotation speed of the centrifugal pump for the introduction of coal powder into the pressurized chamber.

7. The process of claim 1, wherein the gas leakage created to the centrifugal pump amounts to about 0.1 to about 5% by weight of the coal powder introduced to the chamber.

8. An apparatus for the supply of dry, free-flowing coal powder to a high-pressure coal gasification reactor, comprising:

a high-pressure chamber, including means for supplying gas to the chamber to provide high pressure therein, and centrifugal pump means for supplying coal powder to the chamber under high pressure, said centrifugal pump means comprising:

an inlet tube passing through a wall of the high-pressure chamber; and a plurality of rotatable centrifugal nozzles grouped to form a rotor connected with the inlet tube and disposed in the chamber in a radial position relative to the inlet tube, each of said centrifugal nozzles respectively tapering outwardly from said inlet tube and having a longitudinal inverse trumpet shape; and a dosing apparatus means for passing the coal powder from the high pressure chamber to a high-pressure coal gasification reactor.

9. An apparatus for the supply of dry, free-flowing coal powder to a high-pressure coal gasification reactor, comprising:

a high-pressure chamber, including means for supplying gas to the chamber to provide high pressure therein, and centrifugal pump means for supplying coal powder to the chamber under high pressure, said centrifugal pump means comprising:

an inlet tube passing through a wall of the chamber; and a plurality of rotatable centrifugal nozzles grouped to form a rotor connected with the inlet tube and disposed in the chamber in a radial position relative to the inlet tube, each of said centrifugal nozzles respectively tapering outwardly from said inlet tube and having a wall provided with holes between opposing ends thereof; and a dosing apparatus means for passing the coal powder from the high-pressure chamber to a high-pressure coal gasification reactor.

10. The apparatus of claim 9, wherein each of the outwardly tapered centrifugal nozzles is provided with valve means for controlling passage of gas through said holes.

* * * * *